（12） United States Patent
Ellsworth et al.

(10) Patent No.: US 10,023,317 B2
(45) Date of Patent: Jul. 17, 2018

(54) FLIGHT DECK TAKEOFF DUCT AND TRIM AIR MIX MUFF

(71) Applicant: The Boeing Company, Chicago, IL (US)

(72) Inventors: Scott P. Ellsworth, Everett, WA (US); Andrew D. Clark, Everett, WA (US); Taylor Goodwin, Everett, WA (US)

(73) Assignee: The Boeing Company, Chicago, IL (US)

( * ) Notice: Subject to any disclaimer, the term of this patent is extended or adjusted under 35 U.S.C. 154(b) by 378 days.

(21) Appl. No.: 14/747,983

(22) Filed: Jun. 23, 2015

(65) Prior Publication Data

US 2016/0376009 A1    Dec. 29, 2016

(51) Int. Cl.
*F25D 21/00* (2006.01)
*B64D 13/06* (2006.01)

(52) U.S. Cl.
CPC ...... *B64D 13/06* (2013.01); *B64D 2013/0666* (2013.01); *B64D 2013/0688* (2013.01)

(58) Field of Classification Search
CPC . B64D 13/06; B64D 13/08; B64D 2013/0666
USPC .............. 454/71, 72, 75, 76, 160, 161
See application file for complete search history.

(56) References Cited

U.S. PATENT DOCUMENTS

| | | | | |
|---|---|---|---|---|
| 3,409,274 A | * | 11/1968 | Lawton | B01F 5/0475 261/76 |
| 3,735,569 A | * | 5/1973 | Micheller | F22B 37/268 122/34 |
| 3,929,285 A | * | 12/1975 | Daugherty, Jr. | F24F 3/056 236/13 |
| 4,349,360 A | * | 9/1982 | Schuurmans | B01D 47/06 261/79.2 |
| 4,602,925 A | * | 7/1986 | Huffman | B01D 45/16 122/488 |
| 4,625,916 A | * | 12/1986 | Nieuwkamp | B05B 7/0458 239/431 |
| 4,629,481 A | * | 12/1986 | Echols | B01D 45/16 122/34 |

(Continued)

OTHER PUBLICATIONS

Chapter 15: Ice and Rain Protection, AMT Airframe Handbook vol. 2 (full version) (FAA-H-8083-31), https://www.faa.gov/regulations_policies/handbooks_manuals/aircraft/amt_airframe_handbook/, May 7, 2013.

(Continued)

*Primary Examiner* — Ljiljana Ciric
(74) *Attorney, Agent, or Firm* — McDonnell Boehnen Hulbert & Berghoff LLP

(57) ABSTRACT

An exemplary ventilation air mixer includes a branch air duct and a trim air mixer. The branch air duct has an inlet that is configured to be coupled to a takeoff port of a main air source duct. The branch air duct has multiple holes arranged about a wall of a mixing portion. The trim air mixer at least partially surrounds the branch air duct and forms a cavity extending from the inlet of the branch air duct to at least the mixing portion. The trim air mixer has a trim air source duct connection coupled at an angle about a midsection. The angle is substantially acute relate to a longitudinal axis of the branch air duct such that trim air entering into the trim air mixer via the trim air source duct connection is directed toward the inlet of the branch air duct.

20 Claims, 8 Drawing Sheets

(56) References Cited

U.S. PATENT DOCUMENTS

| | | | | |
|---|---|---|---|---|
| 4,648,890 A * | 3/1987 | Kidwell | B01D 45/16 | 55/347 |
| 4,654,061 A * | 3/1987 | Jung | B01D 45/16 | 55/447 |
| 4,769,050 A * | 9/1988 | Shaw | B01D 45/00 | 55/319 |
| 4,778,494 A * | 10/1988 | Patterson | B01D 19/0057 | 55/416 |
| 4,819,548 A * | 4/1989 | Horstman | B64D 13/00 | 244/118.5 |
| 4,856,461 A * | 8/1989 | Hayes | F22B 37/266 | 122/488 |
| 4,942,739 A * | 7/1990 | Uda | B64D 13/00 | 55/448 |
| 5,101,883 A * | 4/1992 | Kinmartin | B60H 1/00528 | 165/137 |
| 5,123,501 A * | 6/1992 | Rothman | F01N 1/08 | 181/227 |
| 5,466,272 A * | 11/1995 | Karlsson | B01D 45/16 | 55/457 |
| 5,554,209 A * | 9/1996 | Dingfelder | B01D 45/16 | 55/456 |
| 5,853,443 A * | 12/1998 | Rodgers | B01D 45/08 | 55/456 |
| 5,885,333 A * | 3/1999 | Dix | B01D 45/14 | 376/371 |
| 5,972,171 A * | 10/1999 | Ross | B01D 45/14 | 202/158 |
| 6,251,296 B1 * | 6/2001 | Conrad | A47L 9/1683 | 15/351 |
| 6,364,940 B1 * | 4/2002 | Prueter | E21B 43/36 | 55/345 |
| 6,389,826 B2 * | 5/2002 | Buchholz | B64D 13/06 | 165/205 |
| 6,460,353 B2 * | 10/2002 | Udobot | B64D 13/06 | 62/275 |
| 6,524,373 B2 * | 2/2003 | Afeiche | B01D 45/16 | 55/396 |
| 6,726,354 B1 * | 4/2004 | Breuer | B01F 5/0475 | 261/76 |
| 6,767,007 B2 * | 7/2004 | Luman | B01F 3/0446 | 261/76 |
| 6,921,047 B2 * | 7/2005 | McColgan | B64D 13/00 | 236/13 |
| 6,971,607 B2 * | 12/2005 | McColgan | B64D 13/00 | 244/118.5 |
| 7,258,727 B2 * | 8/2007 | Greif | B01D 45/16 | 55/396 |
| 7,266,958 B2 * | 9/2007 | Milde | B01D 45/16 | 55/319 |
| 7,338,545 B2 * | 3/2008 | Bazzarella | B01D 45/16 | 55/355 |
| 7,591,869 B2 * | 9/2009 | Jensen | B64D 13/00 | 55/396 |
| 7,691,185 B2 * | 4/2010 | Darke | B04C 3/06 | 55/328 |
| 8,002,866 B2 * | 8/2011 | Kondo | F22B 37/327 | 137/171 |
| 8,157,432 B2 * | 4/2012 | Tysse | B01F 5/0212 | 366/101 |
| 8,303,384 B2 * | 11/2012 | Krakowski | B01F 3/02 | 454/160 |
| 8,394,163 B2 * | 3/2013 | Hildebrand | B64D 13/00 | 55/434 |
| 8,500,835 B2 * | 8/2013 | Wieres | F01N 3/021 | 55/385.3 |
| 8,651,170 B2 * | 2/2014 | Maeda | F28D 7/0041 | 165/152 |
| 8,651,926 B2 * | 2/2014 | Gundlach | B01D 45/08 | 454/76 |
| 8,708,786 B2 * | 4/2014 | Schmid | B64D 13/08 | 454/71 |
| 8,733,694 B2 * | 5/2014 | Francisco | B64D 33/02 | 244/53 B |
| 8,789,766 B2 * | 7/2014 | Baldauf | B64D 13/00 | 137/3 |
| 8,925,624 B2 * | 1/2015 | Kuroyanagi | F02M 25/0737 | 165/157 |
| 8,967,238 B2 * | 3/2015 | Meschke | F28D 9/005 | 165/166 |
| 9,067,163 B2 * | 6/2015 | McColgan | B64D 13/00 | |
| 9,151,539 B2 * | 10/2015 | Army | B64D 13/06 | |
| 9,272,293 B2 * | 3/2016 | Bizzarro | B04C 5/06 | |
| 9,308,480 B2 * | 4/2016 | Leiss | B01D 45/08 | |
| 9,511,868 B2 * | 12/2016 | Stengel | B64D 13/00 | |
| 9,744,478 B1 * | 8/2017 | Ball, IV | B01D 17/0211 | |
| 9,783,307 B2 * | 10/2017 | Bruno | B64D 13/06 | |
| 9,862,494 B2 * | 1/2018 | Van Lieu | B64D 13/00 | |
| 2002/0004367 A1 * | 1/2002 | Murai | B01F 5/0641 | 454/156 |
| 2003/0080244 A1 * | 5/2003 | Dionne | B64D 33/08 | 244/57 |
| 2004/0031599 A1 * | 2/2004 | Wilson | F28D 9/0031 | 165/166 |
| 2008/0210816 A1 * | 9/2008 | Feisthammel | B01F 3/02 | 244/118.5 |
| 2008/0242210 A1 * | 10/2008 | Viertel | B64D 13/00 | 454/76 |
| 2009/0032330 A1 * | 2/2009 | Holmgren | B60H 1/00564 | 181/224 |
| 2009/0071556 A1 * | 3/2009 | Bourlart | B01F 3/02 | 137/597 |
| 2009/0073799 A1 * | 3/2009 | Bourlart | B01F 3/02 | 366/107 |
| 2009/0163130 A1 * | 6/2009 | Zambergs | B64D 13/00 | 454/71 |
| 2009/0163131 A1 * | 6/2009 | Walkinshaw | B60H 3/0641 | 454/76 |
| 2012/0273051 A1 * | 11/2012 | Kelnhofer | B64D 13/06 | 137/2 |

OTHER PUBLICATIONS

Cessna Citation XLS Environmental and Temperature Control, http://www.smartcockpit.com/aircraft-ressources/Cessna_Citation_XLS-Environmental_and_Temperature_Control.html, Apr. 8, 2009.

* cited by examiner

FLIGHT DECK TAKEOFF DUCT AND TRIM AIR MIX MUFF

FIELD

The present disclosure relates generally to air conditioning systems such as aircraft air conditioning systems, and more particularly, to air mixers for mixing air in air conditioning systems.

BACKGROUND

Modern aircraft are equipped with an environmental control system (ECS) that provides air supply, thermal control, and cabin pressurization for the aircraft. An ECS typically includes various components, such as a bleed system, air conditioning pack, mix manifold, recirculation system, and cabin ventilation system.

In operation, an aircraft's bleed system extracts compressed air from one of multiple bleed ports on one of the aircraft's engines and provides air to other components of the ECS. For instance, the bleed system may supply air to one of the aircraft's air conditioning packs.

An air conditioning pack is an air cycle refrigeration system that uses outside air at ambient temperature and pressure as the coolant. The air conditioning pack outputs cold, conditioned air. In some instances, the cold air may even be below freezing (i.e., at a temperature of less than 32° F.). The cold air leaving the air conditioning pack then travels via a pack source duct to a mixing chamber, referred to as a "mix manifold", where the cold air is mixed with filtered recirculated air from the aircraft's cabin.

The mix manifold, in turn, supplies air to the aircraft's cabin ventilation system. The cabin ventilation system supplies air to various seating zones of the aircraft's cabin. Within the cabin ventilation system, the air is mixed with trim air (i.e. hot bleed air from the aircraft's bleed system or an electric motor driven compressor) to raise the temperature of the air to an appropriate temperature for various seating zones of the cabin.

Some aircraft include a separate duct that provides air to the aircraft's flight deck. This separate duct is commonly referred to as a flight deck duct. In one example, the flight deck duct may branch off of the pack source duct at an angle, such that a portion of the conditioned air traveling from the air conditioning pack to the mix manifold is diverted to the flight deck without entering the mix manifold. Trim air may also be injected into the flight deck duct to raise the temperature of the air supplied to the flight deck.

SUMMARY

In one example, a ventilation air mixer is provided. The ventilation air mixer comprises a branch air duct and a trim air mixer. The branch air duct has an inlet, and the inlet is configured to be coupled to a takeoff port of a main air source duct. The branch air duct also has multiple holes arranged about a wall of a mixing portion of the branch air duct. The trim air mixer at least partially surrounds the branch air duct and forms a cavity extending from the inlet of the branch air duct to at least the mixing portion of the branch air duct. The trim air mixer also has a trim air source duct connection coupled at an angle about a midsection of the trim air mixer. The angle is substantially acute relate to a longitudinal axis of the branch air duct such that trim air entering into the trim air mixer via the trim air source duct connection is directed toward the inlet of the branch air duct.

In another example, another ventilation air mixer is provided. The ventilation air mixer comprises a branch air duct and a trim air mixer. The branch air duct has an inlet, and the inlet is configured to be coupled to a takeoff port of a main air source duct. The branch air duct also has multiple holes arranged about a wall of a mixing portion of the branch air duct. The trim air mixer at least partially surrounds the branch air duct and forms a cavity extending from the inlet of the branch air duct to at least the mixing portion of the branch air duct. The trim air mixer has a trim air source duct connection coupled at an angle about a midsection of the trim air mixer. And the trim air mixer comprises at least one baffle located within the cavity and configured to direct trim air entering into the trim air mixer via the trim air source duct connection toward the inlet of the branch air duct.

In still another example, an aircraft air conditioning system is provided. The aircraft air conditioning system comprises an air conditioning pack, a pack source duct, a flight deck duct, and a trim air mixer. The pack source duct defines a passage extending between the air conditioning pack and an outlet, and the pack source duct includes a takeoff port. The flight deck duct has an inlet coupled to the takeoff port of the pack source duct, and the flight deck duct has multiple holes arranged about a wall of a mixing portion of the flight deck duct. The trim air mixer at least partially surrounds the fight deck duct and forms a cavity extending from the inlet of the flight deck duct to at least the mixing portion of the flight deck duct. The trim air mixer also has a trim air source duct connection coupled at an angle about a midsection of the trim air mixer. And the trim air mixer comprises at least one baffle located within the cavity and configured to direct trim air entering into the trim air mixer via the trim air source duct connection toward the inlet of the flight deck duct.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Figure 1:
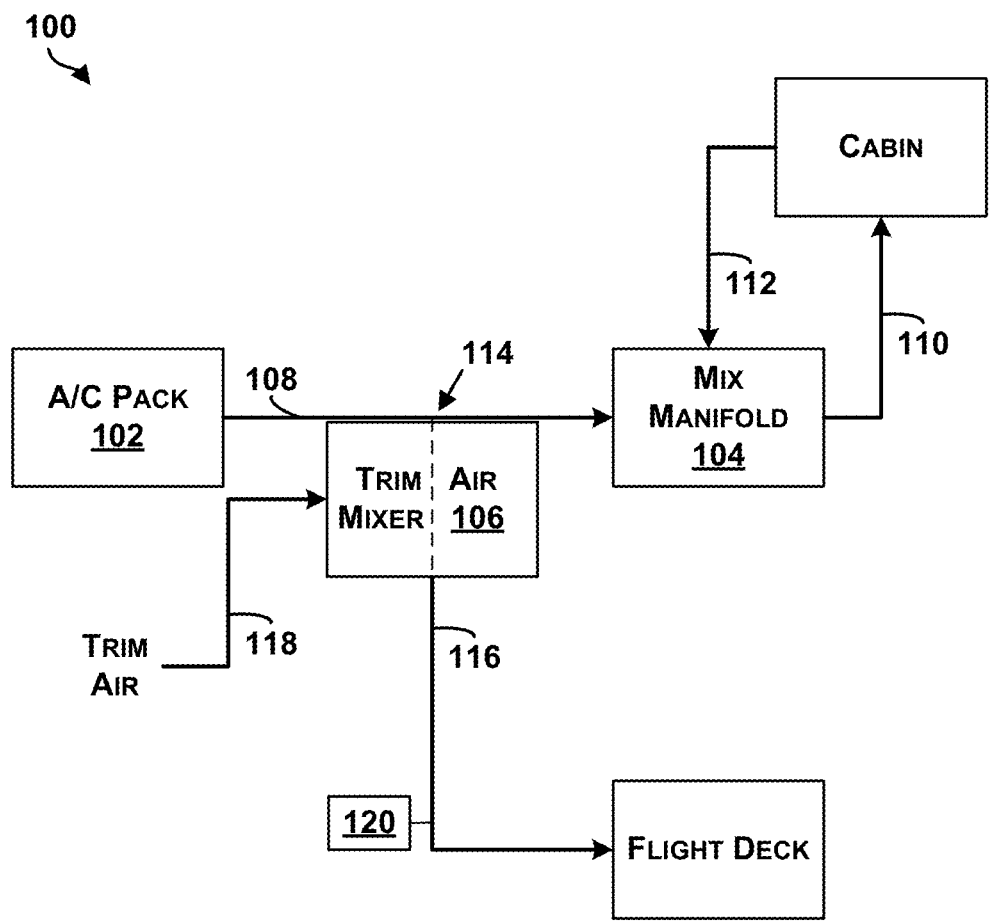
FIG. 1 is a schematic diagram of an example system according to an example embodiment.

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

To help illustrate features of the present disclosure, portions of this disclosure focus on an aircraft air conditioning system by way of example. Those of ordinary skill in the art will readily appreciate, however, that the disclosed principles can be applied as well in other types of air conditioning systems or similar ventilation systems, with variations where appropriate. Further, throughout the present disclosure, a "ventilation air mixer" may also be referred to as "mix muff".

Within examples, ventilation air mixers for mixing conditioned air with trim air and air conditioning systems including such ventilation air mixers are provided. In some examples, the ventilation air mixers may be utilized in an aircraft air conditioning system in which a branch air duct off of a main air source duct conveys air to a flight deck of the aircraft.

Because the conditioned air provided by an air conditioning pack is colder than room temperature, hot air referred to as "trim air" may be mixed into the branch air duct as needed to achieve a desired supply air temperature. Under certain conditions, the branch air duct can ice up, diminishing airflow to the flight deck. To address this issue, in conventional systems, trim air may be injected into the branch air duct at an injection point. This may prevent icing downstream of the trim injection point (i.e., between the injection point and the flight deck). However, such a trim air injection would not prevent icing upstream of the injection point (i.e., between the injection point and the point where the branch air duct branches off of the main air source duct). In addition, the trim air injection would not prevent icing in the theoretical takeoff (i.e., the point where air starts to depart from the main air source duct and enters the branch air duct). Advantageously, the ventilation air mixer described herein may facilitate mixing trim air into a flight deck duct at a point where the branch air duct branches off the main air source duct in a manner that reduces the susceptibility of the branch air duct and the theoretical takeoff to icing.

In accordance with embodiments disclosed herein, an example ventilation air mixer (or mix muff) includes a branch air source duct having an inlet. The inlet is configured to be coupled to a takeoff port of a main air source duct. For instance, the main air source duct may be a pack source duct defining a passage extending between an air conditioning pack and an outlet. The takeoff port may be a point along the passage where the branch air duct branches off of the main air source duct. Additionally, the branch air duct may have multiple holes arranged about a wall of a mixing portion of the branch air duct. In one example, the branch air duct may be a flight deck duct for supplying air to an aircraft's flight deck.

Further, the example ventilation air mixer may include a trim air mixer that at least partially surrounds the branch air duct. As such, the trim air mixer may form a cavity from the inlet of the branch air duct to at least the mixing portion of the branch air duct. The trim air mixer may also include a trim air source duct connection coupled at an angle about a midsection of the trim air mixer. In operation, trim air may flow through the cavity and enter the branch air duct through the holes in the mixing portion of the branch air duct. At the same time, conditioned air traveling through the branch duct passes through the trim air mixer. Because the manner in which the cold, conditioned air passes through the trim air mixer is similar to the way cold hands pass through a muff (i.e., a tube-like hand warmer), this approach is referred to as a "mix muff". Likewise, the ventilation air mixer itself may also be referred to as a "mix muff".

In one example, the angle at which the trim air source duct connection is coupled to the midsection of the trim air mixer may be substantially acute relative to a longitudinal axis of the branch air duct, such that trim air entering into the trim air mixer via the trim air source duct connection is directed toward the inlet of the branch air duct. In this manner, the trim air may warm a leading edge of the branch air duct before the trim air enters the branch air duct. As a result, the trim air may help reduce icing at the takeoff and at other low velocity or stagnation areas near or within the branch air source duct. Controlling icing may, in turn, help improve and maintain airflow to the flight deck.

In another example, the trim air mixer may also include at least one baffle located within the cavity. The at least one baffle may be configured to direct the trim air entering into the trim air mixer via the trim air source duct connection toward the inlet of the branch air duct. For instance, the trim air mixer may include one or more blanking plates extending outward from the branch air duct. As such, the one or more blanking plates may affect the flow of trim air within the cavity between the trim air mixer and the branch air duct. As discussed above with respect to the angle of the trim air source duct connection, the at least one baffle may likewise cause the trim air to warm the leading edge of the branch air duct before the trim air enters into the branch air duct, such that the trim air helps reduce icing.

Various other features of the example ventilation air mixer discussed above are also described hereinafter with reference to the accompanying figures.

Referring now to the figures, FIG. 1 is a schematic diagram of an example system 100 according to an example embodiment. In one embodiment, the example system 100 may be part of an air conditioning system of an aircraft. As shown in FIG. 1, the example system 100 includes an air conditioning pack 102, a mix manifold 104, and a trim air mixer 106. The air conditioning pack 102 may be an air cycle refrigeration system that uses outside air at ambient temperature and pressure as the coolant. For instance, the air conditioning pack 102 may include a refrigeration unit known as an air cycle machine (ACM) and various associated components. The ACM may use outside air as a coolant to cool air received from one or more engine bleed valves, an auxiliary power unit, an electric motor driven compressor, or a ground source. Generally, the air conditioning pack 102 may output conditioned air at a temperature that is below room temperature. In one instance, the air conditioning pack 102 may output air at a temperature that is below freezing (i.e., less than 32° F.). As one example, the air conditioning pack 102 may output air at a temperature of about 25° F.

The conditioned air from the air conditioning pack 102 may travel to the mix manifold 104 via a pack source duct 108. The mix manifold 104 may be a mixing chamber where the conditioned air is mixed with filtered recirculated air from the aircraft's cabin. In operation, the mixed air provided by the mix manifold 104 may travel to an aircraft's cabin via one or more cabin supply ducts 110 and a cabin ventilation system (not shown). In the cabin ventilation system, the air may be directed towards overhead distribution nozzles, for instance. Additionally, in the cabin ventilation system, the air may be mixed with trim air to raise the temperature of the air to an appropriate temperature for various seating zones.

A portion of the air supplied to the cabin may also be returned to the mix manifold 104 via one or more recirculation ducts 112. In practice, the recirculated air may also be filtered prior to being returned to the pack source duct 108. Generally, the air output by the mix manifold for delivery to the cabin may be approximately 50% conditioned air and 50% filtered recirculated air. Thus, the mixing manifold may combine an approximately equal quantity of conditioned air and filtered recirculated air. However, other configurations are also possible, such as more conditioned air than filtered recirculated air or more filtered recirculated air than conditioned air. In other examples, the recirculation ducts 112 may branch into the pack source duct 108 or the pack source duct 108 may branch into the recirculation ducts 112 (not shown), rather than having the recirculation ducts 112 and the pack source duct 108 coupled directly to the mix manifold 104 as shown in FIG. 1.

The pack air source duct 108 may include a takeoff port 114, to which an inlet of a flight deck duct 116 is coupled. The flight deck duct 116 may supply air to the aircraft's flight deck. In practice, the flight deck duct 116 may branch off of the pack source duct at an angle, such that a portion of the conditioned air traveling along the pack air source duct 108 is diverted into the flight deck duct 116. In one example, the flight deck duct 116 may branch off from the pack air source duct 108 at an angle that is approximately 90°. Such a configuration may reduce the chance of airborne ice generated upstream of the flight deck duct 116 making its way into the flight deck duct 116. In another example, the flight deck duct 116 may branch off from the pack air source duct 108 at an angle that is less than 90°. Such a configuration may reduce air pressure losses in the flight deck duct 116 and may also reduce the stagnation area where ice tends to accrete.

As shown in FIG. 1, the trim air mixer 106 is provided at the point where the flight deck duct 116 branches off of the pack air source duct 108. As discussed more thoroughly below, the trim air mixer 106 may at least partially surround the flight deck duct 116, forming a cavity extending from the inlet of the flight deck duct 116 to at least mixing portion of the flight deck duct 116. The mixing portion may be a portion of the flight deck duct 116 having multiple holes arranged about a wall of the flight deck duct 116. And it is through these holes that trim air may enter the flight deck duct 116. More particularly, the trim air mixer 106 may include a trim air source duct connection 118 coupled at an angle about a midsection of the trim air mixer 106, and the trim air source duct connection 118 may supply trim air that is warmer than the conditioned air in the flight deck duct 116 to the trim air mixer 106. After traveling through the trim air mixer 106, the trim air may enter into the flight deck duct 116 via the holes in the mixing portion of the flight deck duct 116. In one example, a bleed system of the aircraft (not shown) may provide the trim air. In another example, an electric motor driven compressor (not shown) may provide the trim air.

Furthermore, as shown in FIG. 1, the example system 100 may also include a temperature sensor 120 configured to measure the air temperature of the air in the flight deck duct 116. As depicted, the temperature sensor 120 is located at a position that is downstream of the trim air mixer 106. Based on measurements provided by the temperature sensor 120, the amount of trim air supplied to the trim air mixer 106 may be adjusted, in order to provide air at a desired output air temperature for the flight deck.

In line with the discussion above, in some systems, the flight deck duct, or more generally, any branch air duct, can ice up, diminishing airflow to the outlet of the branch air duct. The nature of the ice depends on the conditions under which it is formed.

Under conditions where entrained moisture occurs at sub-freezing air conditioning pack outlet conditions (e.g., near air temperatures of 25° F.), ice may grow like a hoar frost. Rather than being like snow that forms in one place and is then deposited in another place, the ice grows on anything exposed to the airstream. The ice may grow in stagnation areas as well as smooth walls of straight ducting. The ice grown on stagnation areas and low velocity areas (e.g., crevices, eddies, etc.) is particularly resilient. In these locations, it has a consistency approximating soft polyurethane foam, with the exception that when it is depressed, it does not bounce back as polyurethane foam would. The ice is structurally strong enough to grow into and withstand the forces of the air flowing in the branch air duct. Throughout the present disclosure, this type of ice may be referred to as "soft" ice.

On the other hand, liquid water that is exposed to sub-freezing air forms ice like in an ice cube. Throughout the present disclosure, this type of ice is referred to as "hard" ice. Hard ice is formed when condensate (e.g., from a recirculation heat exchanger) freezes or when soft ice melts and then is refrozen.

In systems in which trim air is injected into the branch air duct at an injection point (e.g., using a piccolo spray tube positioned within the branch air duct), such an injection does not prevent icing upstream of the injection point. Specifically, soft ice may build up in the theoretical takeoff to the branch air duct and in the branch air duct itself. This soft ice can diminish the airflow in the branch air duct.

Experiments were conducted to evaluate the icing and the resulting restriction of airflow in an aircraft air conditioning system. During a two-hour experiment in which the outlet air temperature at an air conditioning pack was 25° F. and the entrained moisture averaged about 20 grs/lbm, the flight deck duct airflow dropped to as low as 75% of its starting airflow. This experiment was conducted without trim air injected into the flight deck duct via a piccolo spray tube. Had trim air been included, the reduction in airflow would have been less by some unknown amount. However, trim air would not have prevented icing upstream of the point of trim injection. Particularly, it would not have prevented icing in the takeoff to the flight deck duct. Furthermore, due to the presence of ice in the flight deck duct takeoff and the ducting upstream of the flight deck trim air injection, it is also possible that ice might have found its way into the flight deck itself, be it as ice or water.

Figure 2:
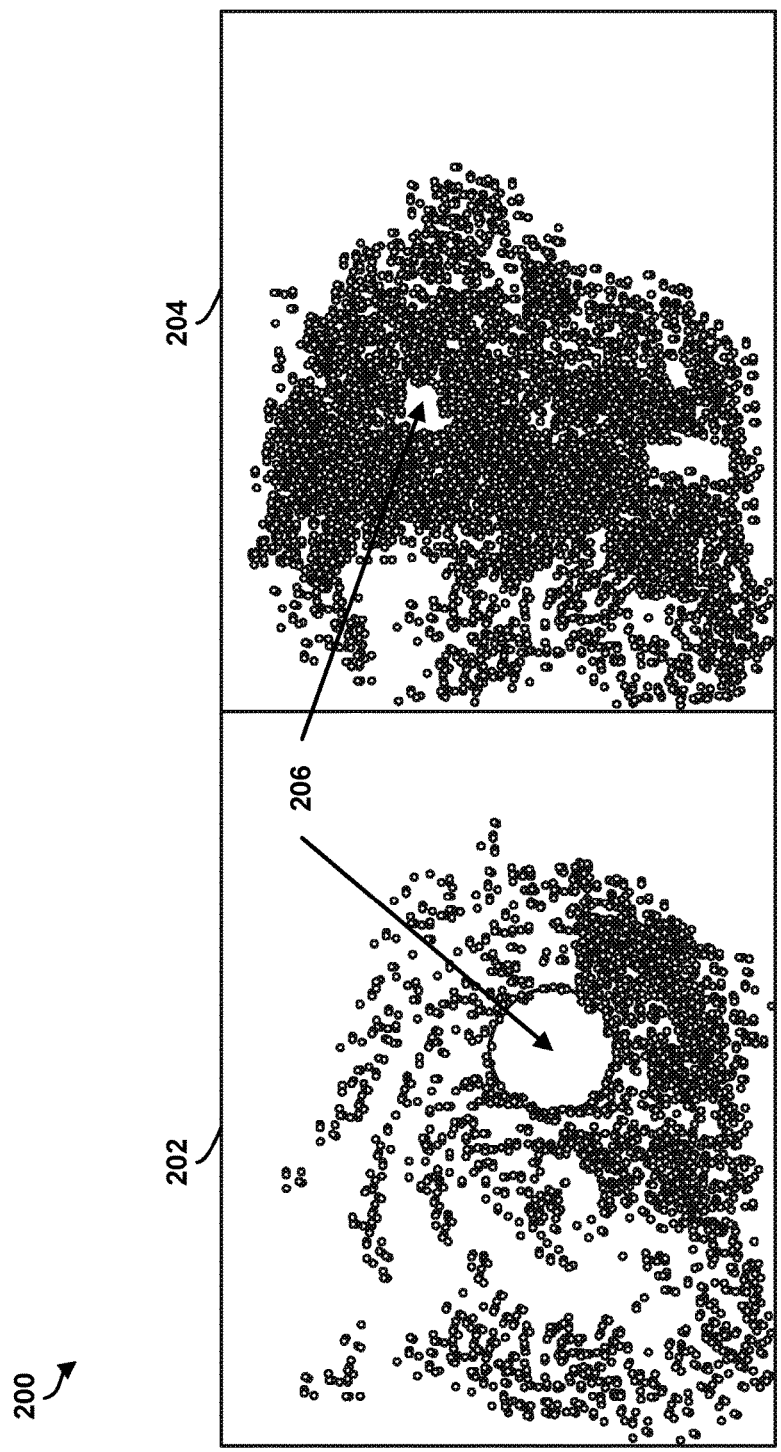
FIG. 2 is a conceptual illustration of icing in an air conditioning system.

FIG. 2 is a conceptual illustration 200 showing icing at a theoretical takeoff to a branch air duct. The conceptual illustration 200 includes a first image 202 and a second image 204 that show the amount of ice at a first time and at a second, later time, respectively. The first image 202 and the second image 204 illustrate the view from inside a pack source duct looking toward an opening 206 to a flight deck duct. In the first image 202, ice has built up around the walls of the pack air source duct and near the takeoff to the flight deck duct. In the second image 204, even more ice has built up, and the ice almost completely blocks off the opening 206 to the flight deck duct.

In order to reduce the buildup of ice, a method of injecting the trim air right at the takeoff to the flight deck duct itself was developed. As discussed above, the method developed and described herein is called a "mix muff", making reference to the tube-like hand warmer. The pack air headed to the flight deck passes through a trim air mixer like hands pass through a muff. Instead of trim air being inserted into the center of the pack air with a piccolo tube injector, the walls of the flight deck duct are perforated and trim is injected in the pack air through these openings in the flight deck duct walls. Likewise, as mentioned above, the ventilation air mixer described herein may also be referred to as a "mix muff".

The mix muff, or ventilation air mixer, is positioned so that it is the flight deck duct takeoff. Inside the mix muff, before the trim air enters into the flight deck duct, a portion of the trim air is directed toward the leading edge (including the stagnation point) of the takeoff. In this manner, the trim air warms the surface of the flight deck duct to above freezing so that the susceptibility of the surface to icing is reduced.

Figure 3:
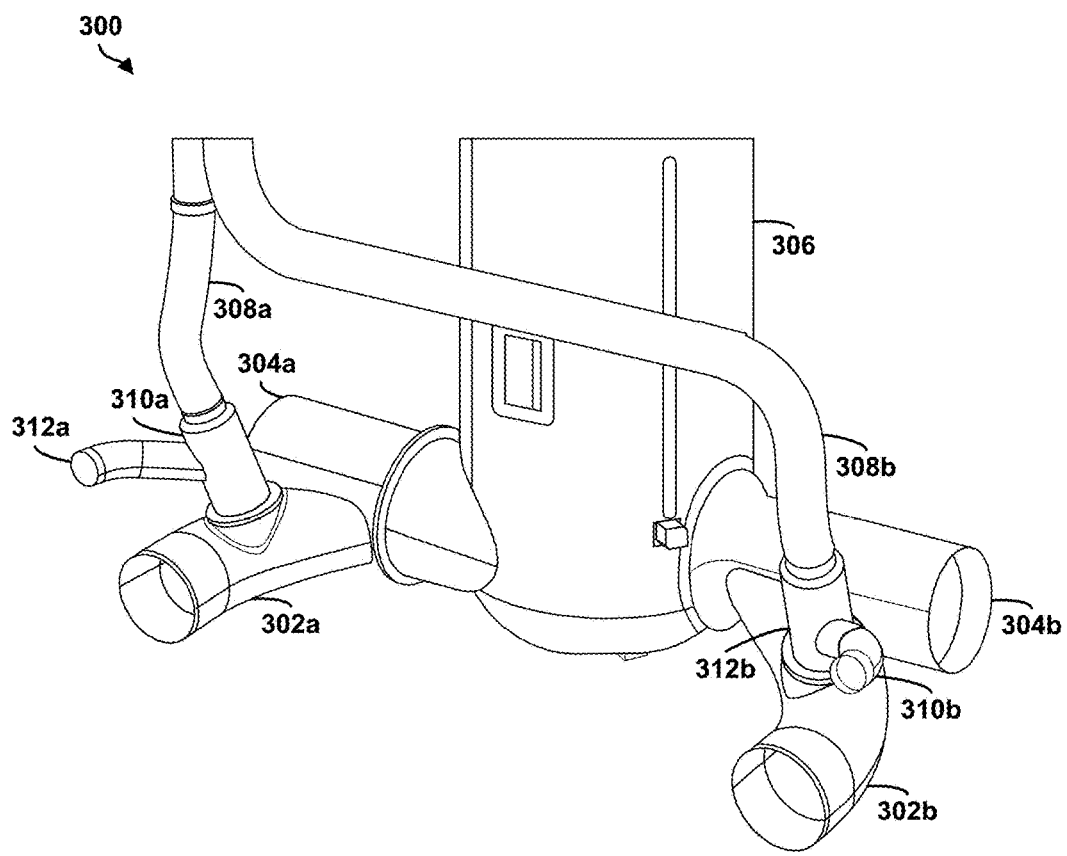
FIG. 3 is a conceptual illustration of an example system according to an example embodiment.

An example of the location of the ventilation air mixer is more readily described with reference to FIG. 3. FIG. 3 is a conceptual illustration 300 of an example system according to an example embodiment. The conceptual illustration 300 depicts an aircraft air conditioning system having a first pack air source duct 302a and a second pack air source duct 302b as well as a first recirculation air duct 304a and a second recirculation air duct 304b. Each of the first pack air source duct 302a, second pack air source duct 302b, first recirculation air duct 304a, and second recirculation air duct 304b provide air to a mix manifold 306.

In addition, the aircraft air conditioning system includes a first flight deck duct 308a and a second flight deck duct 308b coupled to the first pack air source duct 302a and the second pack air source duct 302b, respectively. And the aircraft air conditioning system includes a first ventilation air mixer 310a and a second ventilation air mixer 310b for mixing trim air from a first trim air source duct connection 312a and a second trim air source duct connection 312b with the first flight deck duct 308a and the second flight deck duct 308b, respectively. An example of the structure of the first ventilation air mixer 310a or the second ventilation air mixer 310b is more readily described with reference to FIGS. 4-6.

Figure 4:
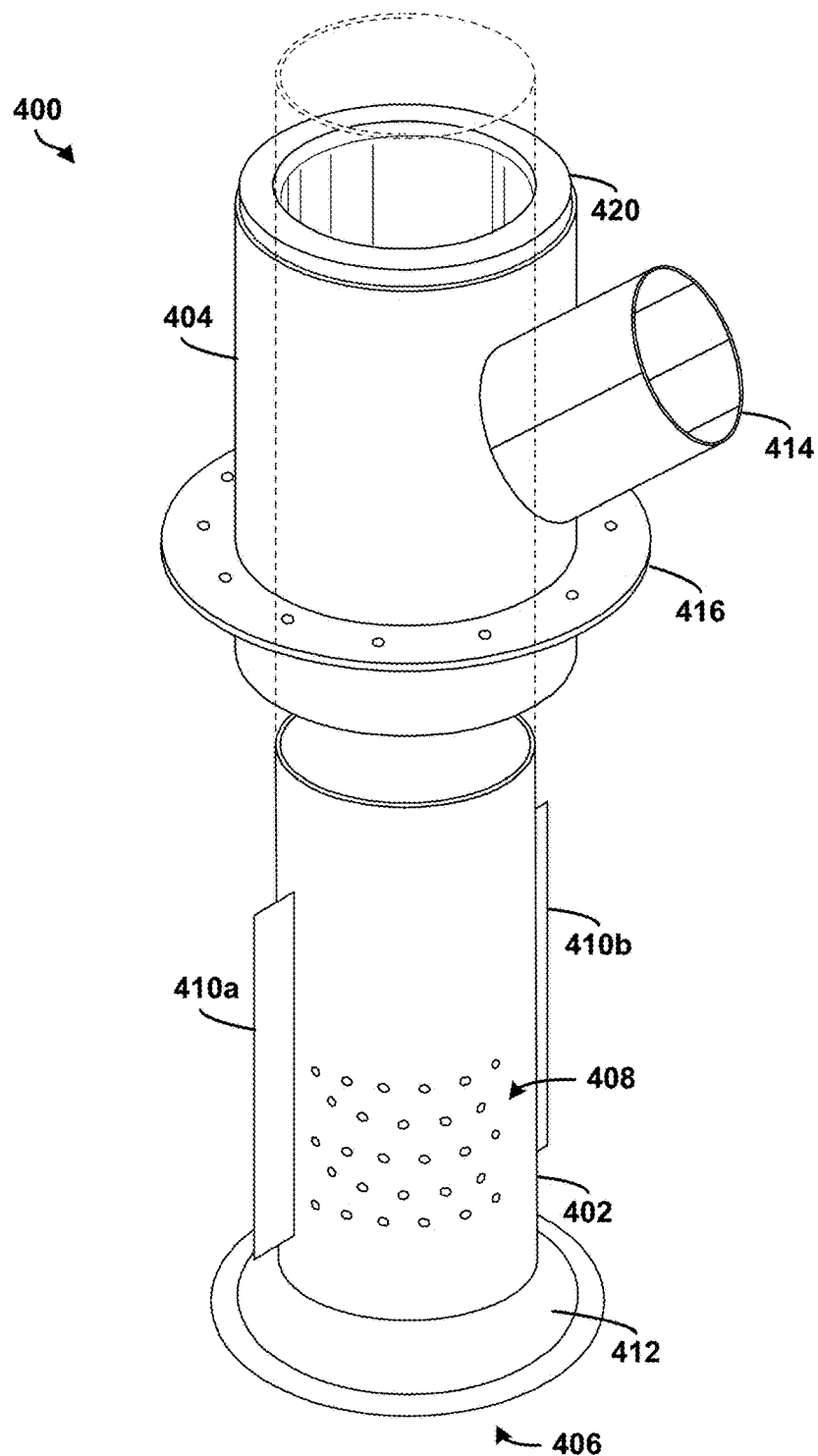
FIG. 4 is an exploded view of an example ventilation air mixer according to an example embodiment.

FIG. 4 is an exploded view of an example ventilation air mixer 400. In one example, the ventilation air mixer 400 may represent the first ventilation air mixer 310a or the second ventilation air mixer 310b of the aircraft air conditioning system illustrated conceptually in FIG. 3. However, the ventilation air mixer 400 may be utilized in other air conditioning systems or similar ventilation systems as well. Further, as discussed above, the ventilation air mixer 400 may also be referred to as a mix muff.

As shown in FIG. 4, the ventilation air mixer includes a branch air duct 402 and a trim air mixer 404. The branch air duct 402 has an inlet 406, a plurality of holes 408, a first blanking plate 410a and a second blanking plate 410b, and a flared end section 412. The inlet 406 may be coupled to a takeoff port of a main air source duct (not shown). For instance, the branch air duct 402 may be a flight deck duct coupled to a takeoff port of a pack source duct. In some examples, the branch air duct 402 may be configured to be coupled to the main air source duct at an angle between about 80 degrees and about 100 degrees. In other examples, the branch air duct 402 may be configured to be coupled to a main air source duct at an angle that is less than 80 degrees.

The plurality of holes 408 may be arranged around the wall of the branch air duct 402. In one example, the holes may be arranged in five rows, with about sixteen holes per row. Each of the holes may be spaced apart by about 22.5°. Further, each row may be offset rotationally from the row next to it. For instance, each row may be offset rotationally by 11.25°. The holes may also be the same or different sizes. In one example, the holes may each be ³⁄₁₆" in diameter. Other configurations are also possible, such as configurations having more or less rows, or holes arranged in random locations as opposed to arranged in rows.

The first blanking plate 410a and the second blanking plate 410b are depicted as extending radially outward from opposite sides of the branch air duct 402. Each of the first blanking plate 410a and the second blanking plate 410b extend from a first longitudinal position that is below a mixing portion of the branch air duct 402 having the plurality of holes 408 to a second longitudinal position that is above the mixing portion of the branch air duct 402. In other configurations, the branch air duct 402 may include more or less blanking plates. Further, in some configurations, the first blanking plate 410a and the second blanking plate 410b may have different lengths or be attached to the branch air duct 402 at different longitudinal positions.

The trim air mixer includes a trim air source duct connection 414. The trim air source duct connection 414 is coupled to a midsection of the trim air mixer 404 at an angle. As such, trim air entering into the trim air mixer 404 via the trim air source is directed toward the inlet 406 and the flared end section 412 of the branch air duct 402. The angle at which the trim air source duct connection 414 is coupled to the trim air mixer 404 may be substantially acute relative to a longitudinal axis of the branch air duct 402. For instance, the trim air source duct connection 414 may be coupled to the trim air mixer 404 at an angle of between about 45° and about 90°. Alternatively, the trim air source duct connection 414 may be coupled to the trim air mixer 404 at an angle of about 90° or even greater than 90° (not shown).

The trim air mixer 404 also includes a flange 416 for securing the trim air mixer 404 to a main air source duct (not shown). By way of example, the flange 416 may be bolted to, welded to, or otherwise attached to a matching flange or surface on the main air source duct.

As shown in FIG. 4, the trim air mixer 404 has a wider diameter than the branch air duct 402, such that the trim air mixer may slide over the branch air duct 402, and be coupled to the flared end section 412. As such, the trim air mixer 404 may form a cavity between the trim air mixer 404 and the branch air duct 402. In one example, the branch air duct 402 may have a diameter of three inches and the trim air mixer 404 may have a diameter of five inches, forming a cavity that is approximately two inches wide. In some examples, when the trim air mixer 404 slides over the branch air duct 402, the first blanking plate 410a and/or the second blanking plate 410b may engage an interior wall of the trim air mixer 404.

Figure 5:
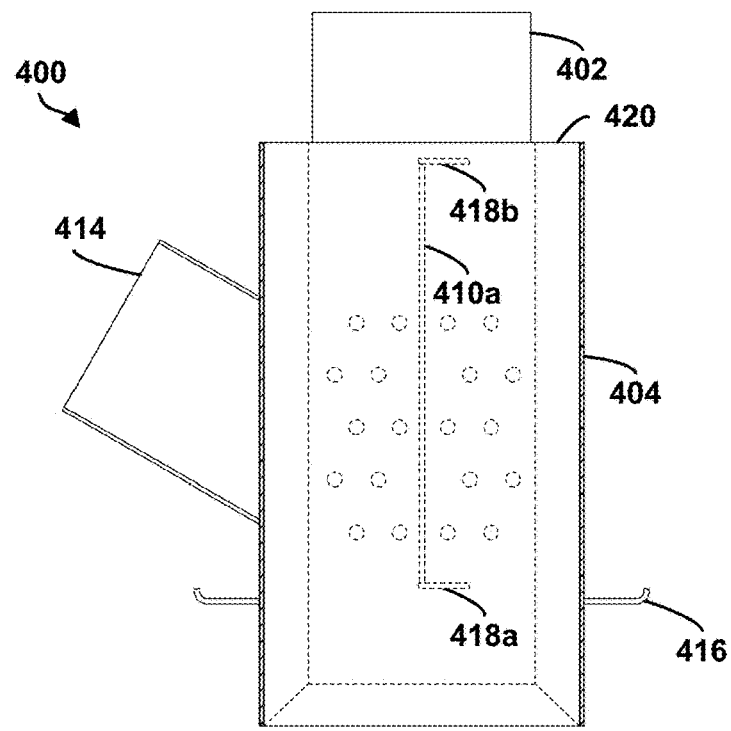
FIG. 5 is a side view of the example ventilation air mixer of FIG. 4.

Referring now to FIG. 5, FIG. 5 is a side view of the example ventilation air mixer 400 of FIG. 4. In FIG. 5, a first support tab 418a and a second support tab 418b are shown. The first support tab 418a and the second support tab 418b may be attached (e.g., welded to) the branch air duct 402, and may support the first blanking plate 410a. Although the second support tab 418b is illustrated as offset longitudinally from a top 420 of the trim air mixer, in another example, the longitudinal position of the second support tab 418b may be adjusted such that the second support tab 418b abuts an inner surface of the top 420 of the trim air mixer 404. Further, note that the holes on the back wall of the branch air duct 402 and the blanking plate 410b are omitted from FIG. 5 for ease of illustration.

Figure 6:
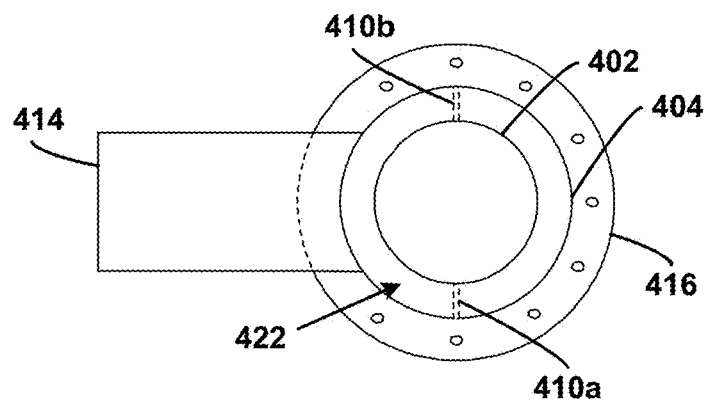
FIG. 6 is a top view of the example ventilation air mixer of FIG. 4.

FIG. 6 is next a top view of the example ventilation air mixer 400 of FIG. 4. In FIG. 6, the branch air duct 402, trim air mixer 404, trim air source duct connection 414, and flange 416 are shown. In addition, outlines of the first blanking plate 410a and the second blanking plate 410b are depicted. Note that the first blanking plate 410a and the second blanking plate 410b are located within a cavity 422 between the branch air duct 402 and the trim air mixer 404.

Figure 7:
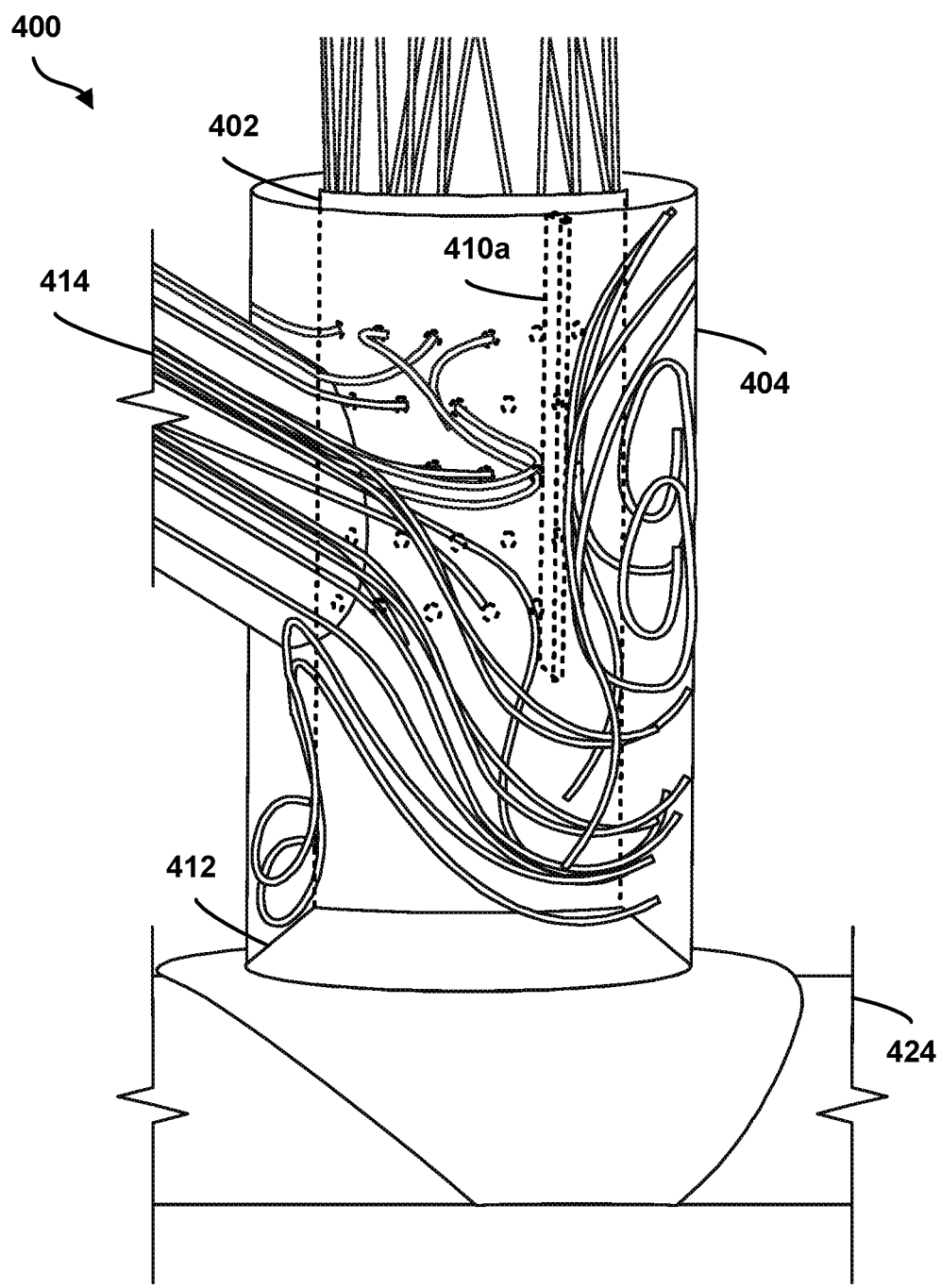
FIG. 7 is a conceptual illustration of trim air streamlines in the example ventilation air mixer of FIG. 4.

In line with the discussion above, due to the angle at which the trim air source duct connection 414 is coupled to the trim air mixer 404 and/or the presence of the first blanking plate 410a and the second blanking plate 410b within the cavity 422, trim air entering the trim air mixer 404 via the trim air source duct connection 414 may be conveyed downwards toward the flared end section 412 and the inlet 406 of the branch air duct 402. FIG. 7 is a conceptual illustration of trim air streamlines in the example ventilation air mixer 400 of FIG. 4.

As shown in FIG. 7, the ventilation air mixer 400 is coupled to a main air source duct 424. As trim air enters the trim air mixer 404 from the trim air source duct connection 414, a portion of the trim air enters the mixer branch air duct 402 via the holes in the branch air duct 402. However, another portion of the trim air is directed toward the flared end section 412 of the branch air duct 402 before entering the holes in the branch duct 402. The trim air directed toward the flared end section 412 of the branch air duct 402 warms the leading edge of the branch air duct, thereby reducing the susceptibility of the theoretical takeoff and the inlet of the branch air duct 402 to icing.

Experiments to test the performance of a modified version of the ventilation air mixer 400 were conducted. In the modified version, the flange 416 was located at a bottom of the trim air mixer 404, and the flange 416 was coupled to a flat platform formed on the surface of a pack air source duct. Using the flat platform created divots in the sides of the pack air source duct near the inlet to the branch air duct 402. During initial testing, ice would form in these divots and then build a bridge across the opening to the flight deck duct. After filling these divots with clay, additional testing was conducted. In the additional testing, the ice accretion was significantly reduced and the flight deck airflow remained constant throughout the testing.

Figure 8:
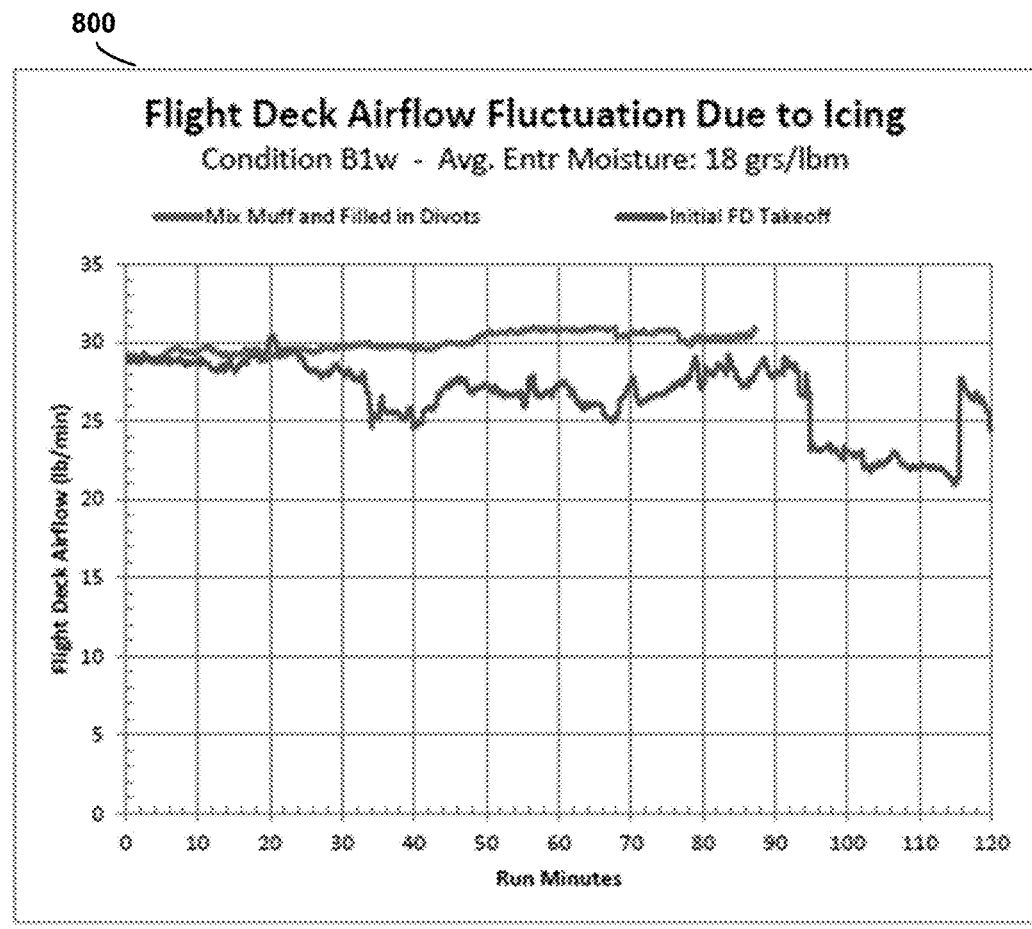
FIG. 8 is a graph illustrating airflow fluctuation due to icing in an example air conditioning system.

FIG. 8 is a graph 800 illustrating the results of the additional testing compared with using an alternative trim air injection approach. As shown in FIG. 8, during the initial flight deck testing using a piccolo spray tube injector, the flight deck airflow dropped to below 25 lb/min after about 90 minutes. On the other hand, using a ventilation air mixer similar to the ventilation air mixer 400, the flight deck airflow remained near about 30 lb/min for the duration of the test. Visual inspection of the opening to the flight deck duct revealed that the level of ice accreting near the opening of the flight deck duct was significantly reduced when using the ventilation air mixer as compared to the piccolo spray tube. Thus, using the ventilation air mixer similar to the ventilation air mixer 400 reduced the buildup of ice and provided an improvement in flight deck airflow.

Figure 9:
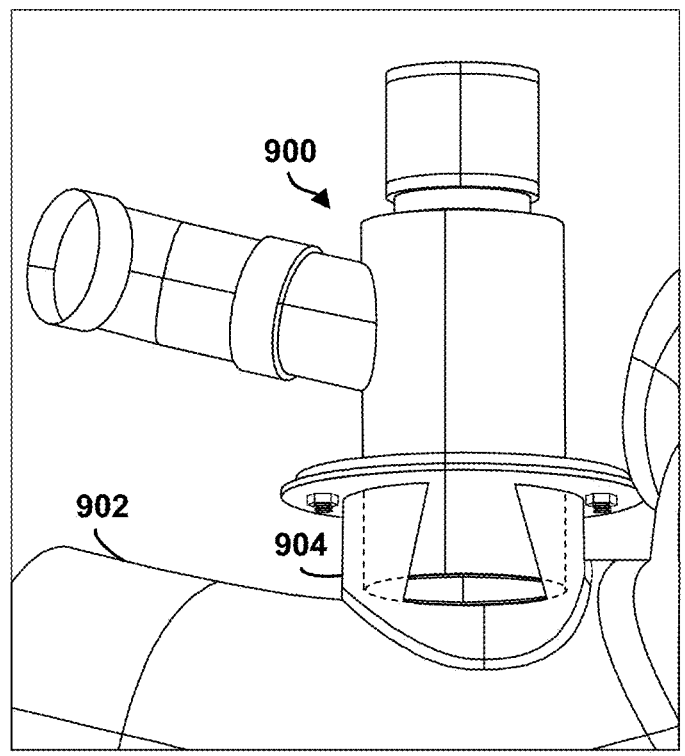
FIG. 9 is a partial cutaway view of an example ventilation air mixer coupled to a main air source duct according to an example embodiment.

Referring now to FIG. 9, FIG. 9 is a partial cutaway view of an example ventilation air mixer 900 according to an example embodiment. The ventilation air mixer 900 may be similar to the ventilation air mixer 400 described above with reference to FIGS. 4-6, for instance. The ventilation air mixer 900 may also be referred to as a mix muff.

As shown in FIG. 9, the ventilation air mixer 900 is coupled to takeoff port of a main air source duct 902. In particular, the main air source duct 902 includes a spud 904, and the ventilation air mixer 900 is located within the spud 904. As a result, a portion of the ventilation air mixer 900 protrudes into a recess in the main air source duct 902. As such, the configuration illustrated in FIG. 9 provides the same effect as filling in divots in the main air source duct with clay; the configuration essentially eliminates the eddy space where ice may accrete if the ventilation air mixer were coupled to a platform formed on the main air source duct 902.

In one example, an air gap (e.g., a quarter-inch air gap) may be maintained between the spud 904 and the ventilation air mixer 900 to keep the spud 904 from being overheated by trim air flowing through the ventilation air mixer. Additionally, in some examples, the ventilation air mixer 900 may be canted slightly so that an edge of the ventilation air mixer is moved out of the airflow of air flowing through the main air source duct 902. Canting the ventilation air mixer 900 in this manner may reduce the possibility of the ventilation air mixer 900 creating an audible tone as air flows through the main air source duct 902.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A ventilation air mixer, comprising:
   a branch air duct having an inlet, wherein the inlet is configured to be coupled to a takeoff port of a main air source duct, and wherein the branch air duct has multiple holes arranged about a wall of a mixing portion of the branch air duct; and
   a trim air mixer at least partially surrounding the branch air duct and forming a cavity extending from the inlet of the branch air duct to at least the mixing portion of the branch air duct, the trim air mixer having a trim air source duct connection coupled at an angle about a midsection of the trim air mixer,
   wherein the angle is substantially acute relative to a longitudinal axis of the branch air duct such that trim air entering into the trim air mixer via the trim air source duct connection is directed toward the inlet of the branch air duct.

2. The ventilation air mixer of claim 1, wherein the trim air is hotter than takeoff port air entering the branch air duct via the takeoff port and the trim air enters into the branch air duct via the multiple holes.

3. The ventilation air mixer of claim 2, wherein the takeoff port air comprises conditioned air from an air conditioning pack of an aircraft.

4. The ventilation air mixer of claim 1, wherein the branch air duct comprises a flight deck duct for supplying conditioned air to a flight deck of an aircraft.

5. The ventilation air mixer of claim 1, wherein the trim air mixer comprises at least one baffle located within the cavity and configured to direct the trim air entering into the trim air mixer via the trim air source duct connection toward the inlet of the branch air duct.

6. The ventilation air mixer of claim 1, wherein the branch air duct is configured to be coupled to the main air source duct at a second angle between about 80 degrees and 100 degrees.

7. The ventilation air mixer of claim 1, wherein the trim air mixer is configured to direct the trim air toward the inlet of the branch air duct to warm the takeoff port to above freezing and control icing.

8. The ventilation mixer of claim 1, wherein the inlet of the branch air duct comprises a flared end section, and wherein an end of the trim air mixer is coupled to the flared end section.

9. The ventilation mixer of claim 8, wherein the trim air mixer further comprises a flange for securing the trim air mixer to the main air source duct, and wherein the flange is located at a position that is offset longitudinally from the end of the trim air mixer so that at least a portion of the flared end section of the branch air duct protrudes into a recess in the main air source duct when the trim air mixer is secured to the main air source duct.

10. A ventilation air mixer, comprising:
a branch air duct having an inlet, wherein the inlet is configured to be coupled to a takeoff port of a main air source duct, and wherein the branch air duct has multiple holes arranged about a wall of a mixing portion of the branch air duct; and
a trim air mixer at least partially surrounding the branch air duct and forming a cavity extending from the inlet of the branch air duct to at least the mixing portion of the branch air duct, the trim air mixer having a trim air source duct connection coupled at an angle about a midsection of the trim air mixer,
wherein the trim air mixer comprises at least one baffle located within the cavity and configured to direct trim air entering into the trim air mixer via the trim air source duct connection toward the inlet of the branch air duct.

11. The ventilation air mixer of claim 10, wherein the trim air is hotter than takeoff port air entering the branch air duct via the takeoff port and the trim air enters into the branch air duct via the multiple holes.

12. The ventilation air mixer of claim 11, wherein the takeoff port air comprises conditioned air from an air conditioning pack of an aircraft.

13. The ventilation air mixer of claim 10, wherein the branch air duct comprises a flight deck duct for supplying conditioned air to a flight deck of an aircraft.

14. The ventilation air mixer of claim 10, wherein the at least one baffle is configured to direct the trim air toward the inlet of the branch air duct to warm the takeoff port to above freezing and control icing.

15. The ventilation air mixer of claim 10, wherein the at least one baffle comprises a blanking plate extending outward from the branch air duct between a first longitudinal position and a second longitudinal position.

16. The ventilation air mixer of claim 15, wherein the blanking plate extends at least along the mixing portion of the branch air duct.

17. The ventilation air mixer of claim 15, wherein the blanking plate engages an interior wall of the trim air mixer.

18. The ventilation air mixer of claim 10, wherein the at least one baffle comprises a first baffle coupled to a first side of the branch air duct and a second baffle coupled to an opposite side of the branch air duct.

19. An aircraft air conditioning system, comprising:
an air conditioning pack;
a pack source duct defining a passage extending between the air conditioning pack and an outlet, the pack source duct having a takeoff port;
a flight deck duct having an inlet coupled to the takeoff port of the pack source duct, the flight deck duct having multiple holes arranged about a wall of a mixing portion of the flight deck duct; and
a trim air mixer at least partially surrounding the flight deck duct and forming a cavity extending from the inlet of the flight deck duct to at least the mixing portion of the flight deck duct, the trim air mixer having a trim air source duct connection coupled at an angle about a midsection of the trim air mixer,
wherein the trim air mixer comprises at least one baffle located within the cavity and configured to direct trim air entering into the trim air mixer via the trim air source duct connection toward the inlet of the flight deck duct.

20. The aircraft air conditioning system of claim 19, wherein the at least one baffle is configured to direct the trim air toward the inlet of the flight deck duct to warm the takeoff port to above freezing and control icing.

* * * * *